United States Patent Office 3,437,495
Patented Apr. 8, 1969

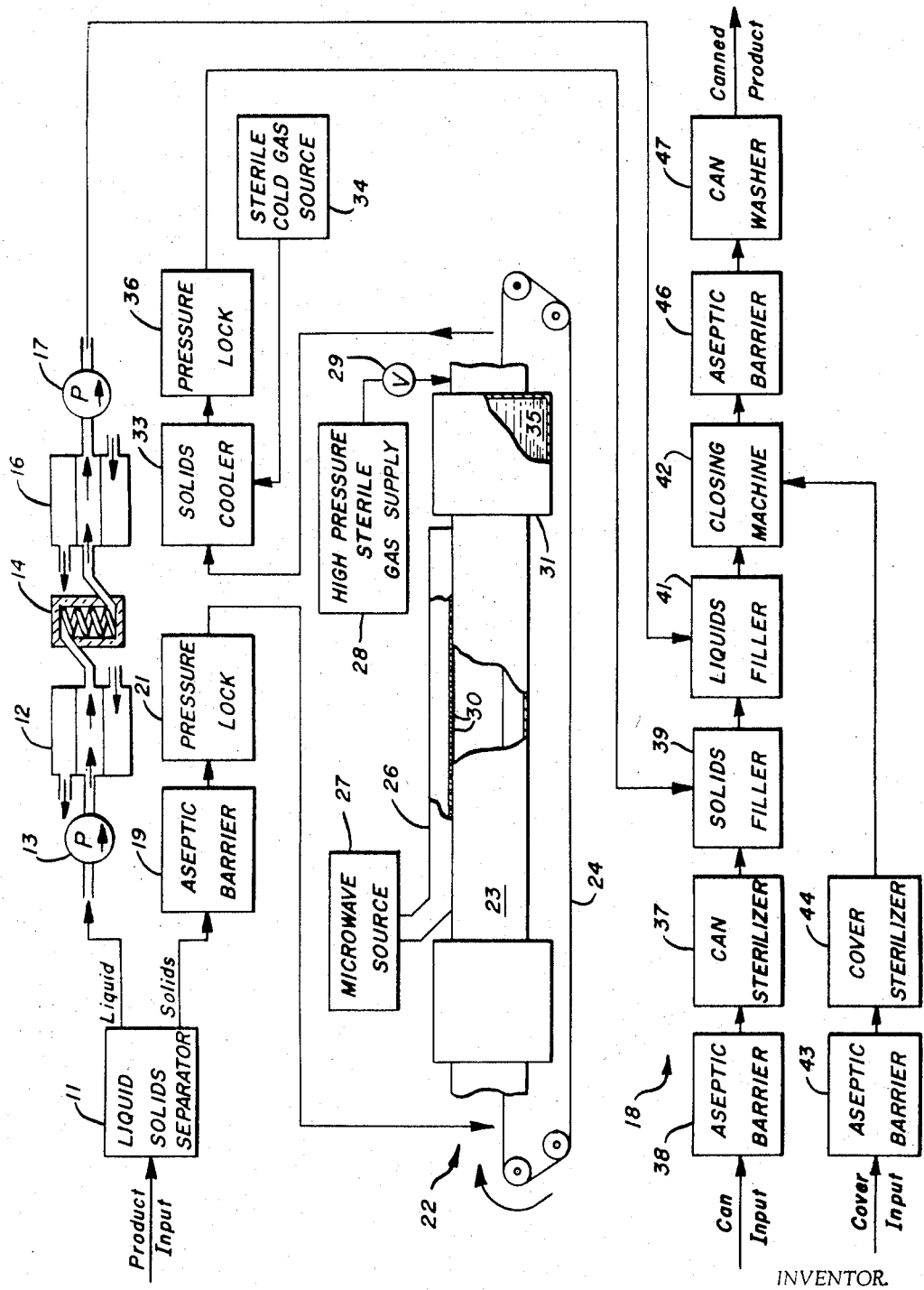

3,437,495
ASEPTIC CANNING OF FOODS HAVING SOLID OR SEMI-SOLID COMPONENTS
Morris R. Jeppson, Alamo, Calif., assignor to Cryodry Corporation, San Ramon, Calif., a corporation of California
Filed Sept. 8, 1964, Ser. No. 394,821
Int. Cl. A23l 3/10; B65b 55/00
U.S. Cl. 99—182
9 Claims

ABSTRACT OF THE DISCLOSURE

In the aseptic canning of products, such as food products, having characteristics of solid matter, the products are introduced into a sterilzed environment where they are exposed to microwave energy for a predetermined time to effect high temperature short time sterilization, and, while being maintained sterilized at a relatively low temperature following sterilization by the microwave energy, are hermetically sealed in sterilized containers in the sterilized environment.

---

This invention relates to the preservation of foods and similar products and more particularly to a method and apparatus for aseptically canning foods having solid or semi-solid constituents.

In the commercial canning of foods, the product is usually sealed into the cans in an unsterilized condition and subsequently heated in a pressure cooker. It is characteristic of such non-aspectic canning techniques that considerable overcooking of the food takes place inasmuch as the sealed cans must be heated for a considerable period of time to completely kill all bacteria. Additional cooking results from the fact that it is not practical to rapidly cool the food after it has been sealed in the can and heated.

While this degree of cooking is desirable for some foods, and not wholly objectionable for many others, there is a large variety of foods which are overcooked from the standpoint of optimum taste, nutritional content and appearance. Examples of foods which undergo a substantial loss of quality during conventional canning are: meats, chicken, turkey, fish, peas, cauliflower, squash, and most fruits.

To meet this problem, aseptic canning methods have been developed. In these processes the food is rapidly heated to a relatively high temperature and then rapidly cooled after which the food is canned in sterilized containers within an aseptic environment. This High Temperature-Short Time technique very markedly reduces cooking inasmuch as sterilization can be effected very rapidly. From one to two hours of cooking are required at 240° F., for example, to completely kill all bacteria, whereas the same result is accomplished in less than one minute at 270° F.

Although aseptic canning has the above-mentioned pronounced advantage, commercial usage of the technique has heretofore been limited largely to liquid products such as milk. As presently practiced, heat exchangers must be used to effect the desired rapid heating and cooling and such equipment is not adapted to handling solids or thick semi-solids.

A process with which the benefits of HTST sterilization can be realized with solid products is disclosed in application Ser. No. 274,648 filed Apr. 22, 1963 by the present inventor and entitled Process for Sterilizing Food Products, now abandoned, and in the copending continuation application Ser. No. 598,563, filed Oct. 14, 1966 for Food Products Sterilization Process. In the method of this copending application, the product is sealed into high strength permanent containers and subjected to microwave irradiation whereby the product is rapidly heated to a very high sterilizing temperature at high pressures. However the process is not an aseptic canning method and requires that the containers have certain specialized properties. Notably, the method cannot be used with conventional metal cans which are opaque to microwave energy.

The present invention provides an aseptic canning technique for solids or semi-solids which does not require specialized containers and with which very rapid cooling as well as rapid heating can be accomplished to sterilize the product without deleterious effects on quality.

Briefly, the invention comprises continuously carrying the food through a sterilized high pressure chamber in which the solid components of the product are subjected to rapid microwave heating followed by forced cooling. To minimize the use of the relatively costly microwave heating, the liquid components of the product may be separated from the solids prior to heating and sterilized by passage through a heat exchanger after which the components are recombined and sealed into sterilized containers. The sealed containers are then removed from the aseptic environment.

The process may make use of any of several forms of rapid cooling. It is generally most economical to cool the liquid component of the product by passage through a second heat exchanger and, in many cases, the cooled liquid may be utilized to cool the solids upon being recombined with the later in the containers. Where there is insufficient liquid for this purpose or where extremely rapid cooling of the solids is desired, the product may be passed through a sterile vacuum chamber following the microwave heating step. The resultant rapid evaporation of a small part of the moisture content of the product effects an almost immediate temperature drop. Alternately, the extremely rapid cooling may be accomplished by spraying sterile cold gas over the solids or by injecting such gas directly into the product with apertured needles.

It is generally more economical and convenient to process foods on a continuous process basis and the above-described steps may readily be performed in this manner. The liquid component of the product continuously passes through the heating and cooling heat exchangers while the solids are continuously passed through the microwave heating chamber by means of a suitable conveyor arranged to travel through a pressure lock and aseptic barrier at each end of the system. The container and cover sterilizers and the fillings and closing mechanisms may be essentially similar to existing types which are readily adapted to continuous process operation.

By means of the above-described techniques virtually any type of food product may be economically canned with minimal cooking. A basic advantage of the process, which allows this result, is that the product may be heated very rapidly to temperatures much higher than are practical with conventional canning techniques, and then very quickly cooled after a relatively brief interval. The short time exposure to a very high temperature is sufficient to kill bacteria but insufficient for any substantial degree of cooking.

Accordingly, it is an object of this invention to provide a method and apparatus for aseptically canning foods or the like having solid, semi-solid or highly viscous components.

It is an object of the invention to provide a method and apparatus for sterilizing and preserving solid or partially solid foods with minimized cooking.

It is another object of the invention to provide a technique for canning food products having solid constituents with which the food may be heated to a very high temperature and then very rapidly cooled to provide high temperature short time sterilization.

It is another object of the invention to provide a high temperature short time food sterilizing and canning process for foods, including foods having solid components, which does not require the use of highly specialized forms of food container.

It is another object of the invention to provide a method for aseptically canning at least partially solid foods on a continuous process basis.

It is still another object of the invention to provide a method and apparatus for aseptically canning food products of types which cannot be satisfactorily processed by conventional aseptic canning techniques.

The invention, including further objects and features of advantage, will be better understood by reference to the following specification together with the accompanying drawing which is a schematic diagram showing successive steps in the process together with apparatus employed in the practice thereof.

Referring now to the drawing, the system shown represents a high volume continuous process food canning plant which is necessarily of considerable mechanical complexity. Inasmuch as many components of the system have been heretofore employed in other contexts, and suitable mechanical structure therefor is known to the art, such components are shown schematically or in block form in the drawing.

An initial step in the process comprises separating the liquid and the solid or semi-solid components of the product in a suitable separator 11. The liquid is then passed into a first heat exchanger 12 through a pump 13 which maintains the liquid in the exchanger under pressure. Exchanger 12 heats the liquid to sterilizing temperatures to effect the desired bacteria kill. Such temperatures may be substantially higher than those employed in conventional canning thereby markedly accelerating bacteria destruction so that the liquid need not be maintained at an elevated temperature for any long period of time. Considering a typical product for purposes of example, the juice of beef Burgundy or chicken in white wine sauce which is to be canned. Such product may be heated to about 270° F. and held thereat for a period of about 30 seconds.

Following the rapid heating in the first exchanger 12, the liquid is passed into a holding vessel or coil 14 where it is maintained at the elevated temperature for the period of time necessary to insure sterilization. The liquid then passes through a second heat exchanger 16 wherein it is rapidly cooled to avoid any unnecessary cooking. From the second exchanger 16, a second pump 17 delivers the sterilized and cooled liquid to a canning line 18 which will be hereinafter described.

The solid components of the product are passed from separator 11 through an aseptic barrier 19, which may be a series of steam jets or other means known to the art, to prevent the migration of live bacteria into the subsequent aseptic portions of the system. From barrier 19, the solids pass through a pressure lock 21 into a continuous process microwave heating tunnel 22. Lock 21 allows the pressure within tunnel 22 to be maintained sufficiently high to prevent boiling as the product is heated to extremely high temperatures.

The microwave tunnel 22 may be of the general type disclosed in application Ser. No. 245,010 filed Dec. 17, 1962 by the present inventor and entitled Continuous Process Microwave Heating Chamber, now abandoned. Salient features of such a chamber include a long tunnel structure 23 formed of electrically conductive material and a conveyor belt 24 extending therethrough for carrying the product through the tunnel. A waveguide 26 extends along a major portion of the tunnel 22 and couples a microwave source 27 thereto. Waveguide 26 is preferably of the type having a series of small transverse slots 30 distributed along the length thereof and opening into the tunnel 22 as described and claimed in copending application Ser. No. 308,284 filed Sept. 11, 1963 by Morris R. Jeppson and Franklin J. Smith and entitled Power Distribution System for Microwave Process Chambers, now U.S. Patent No. 3,263,052.

Microwave energy which is injected downwardly into the tunnel 23 from waveguide 26 is repeatedly reflected back and forth between opposite walls of the tunnel and thus gradually propagates toward the end of the tunnel. In so doing, the energy microwave repeatedly passes through any product which is being carried through the tunnel 23 by conveyor 24. This results in a very rapid and uniform heating of the product.

The microwave tunnel 23 is made gas-tight and a source of high pressure hot sterile gas 28 is coupled thereto through a control valve 29 so that the tunnel may be maintained at an elevated pressure to permit heating of the product above the normal boiling point of the moisture content thereof without deleterious effects.

Considering a typical product for purposes of example, the solid components of beef Burgundy or chicken in wine sauce may be heated to a temperature of 270° F. for a period of about 1 minute. This requires that the pressure within tunnel 23 be at or above 40 pounds per square inch.

Further components of the tunnel structure 22 include hollow-walled end sections 31 which contain a filling of water 35 as described and claimed in the hereinbefore identified copending application Ser. No. 245,010. The water volume 35 in the walls of end sections 31 absorbs any microwave energy which reaches the ends of tunnel 23.

From the pressurized microwave heating tunnel 22 the product is passed to a rapid cooling station 33. Cooling of the product at station 33 may be accomplished by any of several suitable techniques such as spraying the product with sterile cold gas from a source 34. Where the product is unusually bulky or still more rapid cooling is desired, the gas may be injected directly into the product by means of apertured needles or the like. Alternately, cooling station 33 may be a vacuum chamber which will cause a small portion of the moisture in the product to evaporate rapidly and cool the product.

In some instances a separate cooling station 33 for the solids may be dispensed with. In such cases rapid cooling occurs upon the recombination of the solids with the cooled liquids. Using this technique, cooling of the solids is in effect accomplished by the liquid cooling heat exchanger 16.

Using any of these methods, the product should be cooled below the boiling point for atmospheric pressure and in many cases it is desirable to provide still further forced cooling to minimize heat-induced changes in the food.

From cooling station 33, the product is passed to canning line 18 through a second pressure lock 36. In the case where solids cooling is accomplished by recombination of the cooled liquid therewith, rather than by a cooling station 33, the recombination is effected prior to passage of the product through the second pressure lock 36 so that the product is always cooled below the atmospheric boiling point before exposure to atmospheric pressure.

The canning line 18 may be comprised of known mechanisms as adapted for canning in a sterile environment. Suitable structure for components of an aseptic canning system is disclosed, for example, in the text: An Introduction to the Thermal Processing of Foods, by S. A. Goldblith et al., published by the Avi Publishing Company Inc., Westport, Conn., volume 1, pages 1069 to 1080.

In the practice of the present invention cans continuously enter a sterilizer 37 through an aseptic barrier 38. The sterilized cans then move to a first filling machine 39 in which an appropriate amount of the sterilized solids from cooling station 33 is deposited in each such can. In the usual case where the product has liquid components, the cans are only partially filled with solids so that the desired proportion of liquid may be added prior to sealing.

From the first filling machine 39 the partially filled cans pass to a second filling stage 41 at which the liquid component from pump 17 is added. The cans then move to a closing machine 42 and are sealed closed. Where the cans are of the conventional type that require a separate cover, the covers are fed into the closing machine 42 through an aseptic barrier 43 and cover sterilizer 44.

From closing machine 42 the sealed cans pass out of the sterile environment through a terminal aseptic barrier 46 and washer 47. The canned product is then ready for labelling and packing into shipping containers.

It should be understood that the process is applicable to a wide variety of products which may require different degrees of heating, differing processing times and different minimum pressures in the heating chamber. Ideally, the product should generally be heated to the maximum possible temperature as the heating period required for sterilization, and thus the degree of cooking, may then be drastically reduced. However, foodstuffs vary widely in susceptibility to heat damage and therefore specific upper temperature limits must be imposed. These are readily determined empirically by examination and tasting of the product. The minimum chamber pressures necessary to prevent boiling at a particular maximum temperature are readily determined by reference to the well known steam tables.

Whole kernel corn, for example, is satisfactorily processed by heating to about 255° F. during a period of about 8 minutes and with a minimum chamber pressure of about 32 pounds per square inch. Milk products, in contrast, are preferably heated to 268° F. over a period of 1 minute and at a minimum pressure of 40 pounds per square inch.

While the invention has been described with reference to specific process steps, process conditions, and specific structure, many modifications and variations are possible and it is not intended to limit the invention except as defined in the following claims.

What is claimed is:

1. In a method for aseptically canning a product having solid constituents, the steps of disposing said product in a sterilized environment, exposing said product simultaneously to pressure above atmospheric pressure and to radiant microwave energy within said sterilized environment for a predetermined time and effecting rapid and uniform heating to a temperature above the boiling temperature of the product at atmospheric pressure, cooling said product within said sterilized environment to a temperature below said boiling temperature, and sealing said product into an air-tight sterilized container within said sterilized environment at substantially atmospheric pressure following said exposure to microwave energy and said cooling thereof.

2. In a method for aseptically canning products having solid constitutents, the steps comprising passing said products through a sterilized region, heating said products to a temperature above the atmospheric boiling point of water by exposure to microwave energy within a high pressure environment in an initial portion of said region, cooling said products to a temperature below said boiling point within an intermediate portion of said region, passing sterilized containers into said region, and sealing said products into said containers in a subsequent portion of said region following said microwave heating and said cooling of said products.

3. A method for aseptically canning products as described in claim 2 wherein said cooling of said products is accomplished by spraying a sterile cold gas thereon following said exposure of said products to microwave energy.

4. A method for aseptically canning products as described in claim 2 wherein said cooling of said products is accomplished by injecting sterile cold gas directly into said products following said exposure of said products to microwave energy.

5. A method for aseptically canning products as described in claim 2 wherein said cooling of said products is accomplished by maintaining a vacuum within said intermediate portion of said region whereby said products are rapidly cooled by evaporation of a portion of the moisture content thereof.

6. In a method for aseptically canning a food product of the class having liquid and more solid components, the steps comprising separating said liquid and solid components, subjecting said solid components to rapid microwave heating within a sterilized environment, separately heating said liquid component, recombining said liquid and solid components following said separate heating thereof, and sealing said recombined components into sterilized containers within said sterilized environment.

7. A method for canning food products comprising the steps of separating liquid and solid components of said products, rapidly heating said solid components of said products to a temperature above the atmospheric boiling point of water by exposure to microwave energy within a sterile high pressure environment, separately heating said liquid components in a sterile high pressure environment, recombining said liquid and solid components in a sterile environment following said separate heating thereof, and sealing said recombined components into air-tight containers within said sterile environment.

8. A method for canning food products as described in claim 7 wherein said liquid components are rapidly cooled following said heating thereof whereby said liquid components rapidly cool and solid components upon recombination therewith.

9. A method for canning a product of the class having liquid and solider components comprising the steps of separating the liquid and solider components of product, continuously passing said solider components through a sterile pressurized microwave chamber whereby said solider components are rapidly heated, continuously passing said liquid components through a sterile high temperature heat exchanger to rapidly heat said liquid components, continuously passing sterilized containers into a sterile environment, recombining said liquid and solider components in said sterile environment, and sealing said recombined components into said containers within said sterile environment.

References Cited

UNITED STATES PATENTS

| 2,549,216 | 4/1951 | Martin | 99—182 |
| 3,052,559 | 9/1962 | Peebles | 99—214 |
| 3,215,539 | 11/1965 | Landy | 99—221 |
| 3,261,140 | 7/1966 | Long et al. | 53—22 |

LIONEL M. SHAPIRO, *Primary Examiner.*

U.S. Cl. X.R.

99—187, 221, 214